United States Patent
Yamada et al.

(10) Patent No.: US 11,755,040 B2
(45) Date of Patent: Sep. 12, 2023

(54) FLIGHT CONTROL APPARATUS AND FLIGHT CONTROL SYSTEM

(71) Applicant: NTT DOCOMO, INC., Tokyo (JP)

(72) Inventors: Takefumi Yamada, Tokyo (JP); Ken Koumoto, Tokyo (JP); Hidetoshi Ebara, Tokyo (JP); Youhei Oono, Tokyo (JP); Yuichiro Segawa, Tokyo (JP); Yukiko Nakamura, Tokyo (JP); Shinya Hanano, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 486 days.

(21) Appl. No.: 16/756,018

(22) PCT Filed: Jan. 18, 2019

(86) PCT No.: PCT/JP2019/001411
§ 371 (c)(1),
(2) Date: Apr. 14, 2020

(87) PCT Pub. No.: WO2019/146516
PCT Pub. Date: Aug. 1, 2019

(65) Prior Publication Data
US 2020/0387180 A1 Dec. 10, 2020

(30) Foreign Application Priority Data
Jan. 24, 2018 (JP) ................ 2018-009503

(51) Int. Cl.
*G05D 1/10* (2006.01)
*B64C 39/02* (2023.01)
*B64U 10/13* (2023.01)

(52) U.S. Cl.
CPC ......... *G05D 1/1064* (2019.05); *B64C 39/024* (2013.01); *B64U 10/13* (2023.01); *B64U 2201/10* (2023.01)

(58) Field of Classification Search
CPC .... G05D 1/1064; B64C 13/20; B64C 39/024; B64C 2201/027; B64C 2201/141;
(Continued)

(56) References Cited

U.S. PATENT DOCUMENTS

| 10,410,532 B1 * | 9/2019 | Myr ............... G08G 5/0034 |
| 2009/0099712 A1 | 4/2009 | Colich |

(Continued)

FOREIGN PATENT DOCUMENTS

| JP | 2003140747 A | 5/2003 |
| WO | 2017032906 A2 | 3/2017 |

OTHER PUBLICATIONS

International Search Report issued in corresponding PCT Application No. PCT/JP2019/001411, dated Mar. 26, 2019, 2 pages.
(Continued)

*Primary Examiner* — Anne Marie Antonucci
*Assistant Examiner* — Jodi Marie Jones
(74) *Attorney, Agent, or Firm* — DILWORTH IP, LLC

(57) ABSTRACT

A flight control apparatus that enables a flying object to safely pass another flying object includes a detection unit configured to detect, in a predetermined range from a flying object, another flying object. A specifying unit is configured to specify a moving direction of the detected other flying object. A judging unit is configured to judge, based on the specified moving direction, whether or not passing is possible. A determination unit is configured to determine, based on a relationship between the flying object and the other flying object, content of a passing operation to be performed with respect to the other flying object. A flight control unit is configured to, if it is judged that passing is possible, control flight of the flying object and perform the passing operation according to the determined content.

13 Claims, 5 Drawing Sheets

(58) Field of Classification Search
CPC ... B64C 2201/145; G05B 2219/39091; B60W 30/08; B60W 30/095; B60W 30/0953; B60W 30/0956; B60W 30/18163; B60W 60/0011; B60W 2554/4045
USPC ........ 701/3, 2, 4, 11, 16, 23, 15, 301, 36, 8, 701/120, 13, 14, 7, 24, 28, 5, 1, 300, 10, 701/22, 19, 467, 26, 31.1, 408, 528, 532, 701/469, 122, 17, 468, 302, 29.3, 32.3, 701/400, 412, 423, 525, 103, 121, 18, 25, 701/30.3, 416, 418, 472, 514, 70, 99, 701/100, 101, 105, 124, 32.4, 33.1, 33.4, 701/410, 422, 431, 439, 47, 470, 476, 701/486, 49, 50, 500, 516, 517, 527, 531, 701/117, 411, 415, 425, 445, 446, 454, 701/461, 492, 494, 523, 538, 66, 87, 96

See application file for complete search history.

(56) References Cited

U.S. PATENT DOCUMENTS

| | | | | |
|---|---|---|---|---|
| 2017/0227968 A1* | 8/2017 | Klinger | ................ | B64C 39/024 |
| 2017/0330467 A1* | 11/2017 | Umetani | ................ | G05D 1/042 |
| 2018/0012504 A1* | 1/2018 | van Cruyningen | .... | G05D 1/042 |

OTHER PUBLICATIONS

Notices of Reasons for Refusal issued in corresponding Japanese Patent Application No. 2019-567038, dated Jul. 13, 2021.
Notice of Reasons for Refusal issued in corresponding Japanese Patent Application No. 2019-567038, dated Feb. 15, 2022.

\* cited by examiner

| IDENTIFIER | FLIGHT PLAN | | | | | | | PRIORITY OF FLIGHT PURPOSE |
|---|---|---|---|---|---|---|---|---|
| | DEPARTURE PLACE | STOPOVER PLACE | DESTINATION PLACE | FLIGHT PATH | ESTIMATED TIME OF DEPARTURE | ESTIMATED TIME OF ARRIVAL | FLIGHT SPEED | |
| D001 | P1 | P2 | P3 | R1 | T1 | T2 | V1 | 2 |
| D002 | P4 | P5 | P6 | R2 | T3 | T4 | V2 | 1 |
| ⋮ | ⋮ | ⋮ | ⋮ | ⋮ | ⋮ | ⋮ | ⋮ | ⋮ |

| CLASS | CONDITION | LIKELIHOOD OF COLLISION |
|---|---|---|
| FIRST CLASS | MOVING IN APPROACHING DIRECTION | YES |
| THIRD CLASS | MOVING IN AWAY DIRECTION | NO |
| SECOND CLASS | FLIGHT PATHS OVERLAP EACH OTHER AT THE SAME TIME | YES |
| | FLIGHT PATHS DO NOT OVERLAP EACH OTHER AT THE SAME TIME | NO |

*FIG. 8*

FLIGHT CONTROL APPARATUS AND FLIGHT CONTROL SYSTEM

TECHNICAL FIELD

The present invention relates to a technique for controlling flight of flying objects.

BACKGROUND ART

Techniques are known for controlling routes of moving objects so that the moving objects do not collide with each other. For example, JP 2003-140747A discloses that a moving object is stopped in a stop region upon detecting a stopping start signal, and gives way to another moving object.

SUMMARY OF INVENTION

Unmanned flying objects such as drones encompass a flying object that can fly according to a predetermined flight plan without being steered by a person. Meanwhile, when a plurality of flying objects are flying in the same direction in an airspace, a flying object may perform a passing operation of passing another flying object in order to avoid a collision. However, depending on the relationship between the flying object and the other flying object, there may be cases where the flying object cannot safely pass the other flying object using a predetermined passing operation.

The present invention provides a flight control apparatus including: a detection unit configured to detect, in a predetermined range from a flying object, another flying object; a specifying unit configured to specify a moving direction of the detected other flying object; a judging unit configured to judge, based on the specified moving direction, whether or not passing is possible; a determination unit configured to determine, based on a relationship between the flying object and the other flying object, content of a passing operation to be performed with respect to the other flying object; and a flight control unit configured to, if it is judged that passing is possible, control flight of the flying object and perform the passing operation according to the determined content.

The judging unit may further judge, based on movement information of the other flying object, whether or not there is a likelihood of collision between the flying object and the other flying object, and if it is judged that there is a likelihood of collision and passing is possible, the flight control unit may perform the passing operation.

If the specified moving direction corresponds to a moving direction of the flying object, the judging unit may judge that passing is possible.

The flight control apparatus may further include an acquisition unit configured to acquire attribute information that indicates an attribute of an airspace in which the flying object is flying, wherein the judging unit may judge, based on the specified moving direction and the attribute indicated by the acquired attribute information, whether or not passing is possible.

The attribute information may include information indicating whether or not passing is allowed in the airspace, information indicating the size of the airspace, or information indicating whether or not a margin space is added to the airspace, and the judging unit may judge that passing is possible, if passing is allowed in the airspace, the size of the airspace is a predetermined size or larger, or the margin space is added to the airspace.

The determination unit may determine, as content of the passing operation, content such that the flying object flies at a predetermined distance from the other flying object.

The content may include a change in flight speed or a change in flight path.

The determination unit may determine the content based on at least either of weights and performances of the flying object and the other flying object.

The flight control apparatus may further include a notification unit configured to notify, if the passing operation is to be performed, the other flying object of the intention to pass, and to instruct the other flying object to perform a predetermined operation, wherein the flight control unit may perform the predetermined operation, upon being notified by the other flying object of the intention to pass.

Furthermore, the present invention provides a flight control system including: a detection unit configured to detect, in a predetermined range from a flying object, another flying object; a specifying unit configured to specify a moving direction of the detected other flying object; a judging unit configured to judge, based on the specified moving direction, whether or not passing is possible; a determination unit configured to determine, based on a relationship between the flying object and the other flying object, content of a passing operation to be performed with respect to the other flying object; and a flight control unit configured to, if it is judged that passing is possible, control flight of the flying object and perform the passing operation according to the determined content.

According to the present invention, a flying object is enabled to safely pass another flying object.

BRIEF DESCRIPTION OF DRAWINGS

FIG. 6 is a diagram showing an example of operation management database 130 in accordance with the present invention.

FIG. 8 is a diagram showing an example of a method for judging a likelihood of collision in accordance with the present invention.

DETAILED DESCRIPTION OF THE PREFERRED EMBODIMENTS

Figure 1:
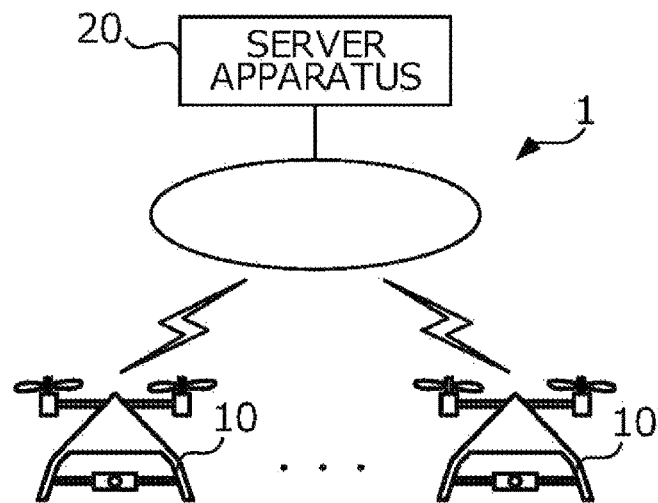
FIG. 1 is a diagram showing an example of a configuration of flight control system 1 in accordance with the present invention.

FIG. 1 is a diagram showing an example of a configuration of flight control system 1. Flight control system 1 is a system for controlling flight of flying objects 10. Flight control system 1 includes a plurality of flying objects 10, and server apparatus 20.

Figure 2:
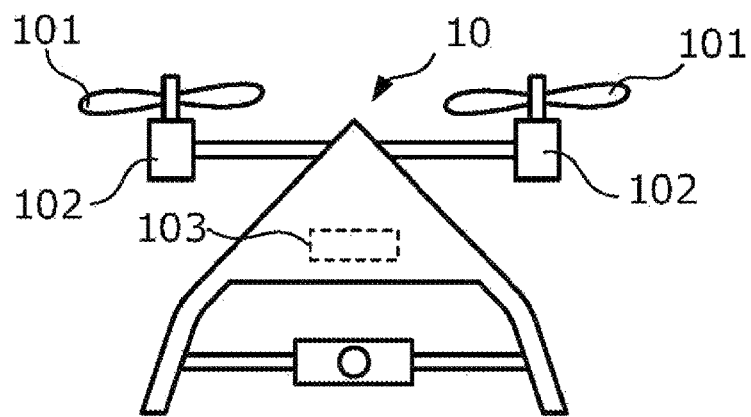
FIG. 2 is a diagram showing an example of outer appearance of flying object 10 in accordance with the present invention.

FIG. 2 is a diagram showing an example of the outer appearance of flying object 10. Flying object 10 is an unmanned aerial vehicle that can autonomously fly without being steered by a person. Flying object 10 is a drone, for example. Flying object 10 is provided with propellers 101, drive apparatuses 102, and battery 103.

Each propeller 101 rotates about a shaft. When propellers 101 are rotated, flying object 10 flies. Drive apparatuses 102 supply power to propellers 101 so that they rotate. Drive apparatuses 102 are motors, for example. Drive apparatuses 102 may be directly connected to propellers 101, or may be connected to propellers 101 via transmission mechanisms for transmitting power of drive apparatuses 102 to propellers 101. Battery 103 supplies electric power to the components of flying object 10 including drive apparatuses 102.

Figure 3:
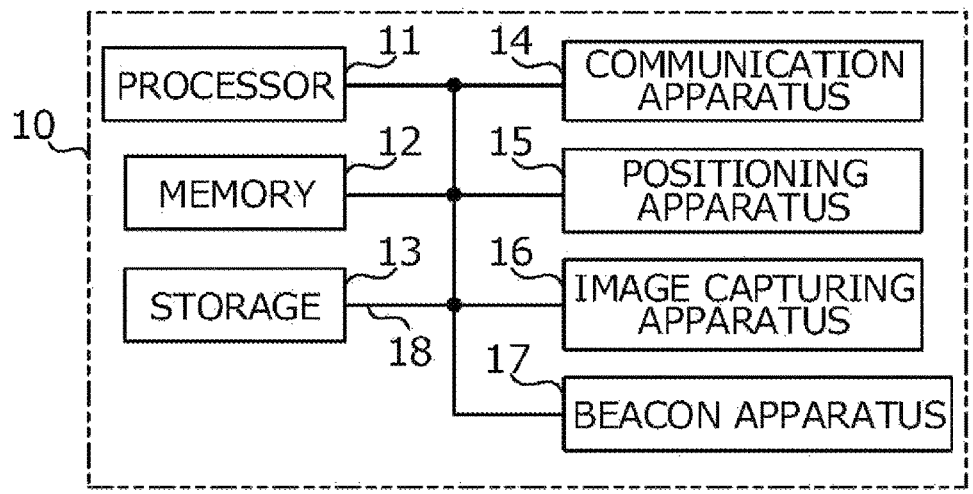
FIG. 3 is a diagram showing a hardware configuration of flying object 10 in accordance with the present invention.

FIG. 3 is a diagram showing a hardware configuration of flying object 10. Flying object 10 may also be physically configured as a computer device that includes processor 11, memory 12, storage 13, communication apparatus 14, positioning apparatus 15, image capturing apparatus 16, a beacon apparatus 17, a bus 18, and the like. Note that, in the following description, the term "apparatus" may be read as a circuit, a device, a unit, or the like.

Processor 11 activates, for example, an operating system to control the entire computer. Processor 11 may also be constituted by a central processing unit (CPU) that includes an interface with peripheral apparatuses, a control apparatus, an arithmetic apparatus, a register, and the like.

Furthermore, processor 11 reads a program (program code), a software module, or data from storage 13 and/or communication apparatus 14 onto memory 12, and executes various types of processing based thereon. As the program, a program for causing the computer to execute at least part of an operation of flying object 10 is used. The various types of processing that are executed in flying object 10 may be executed by one processor 11, or may be executed by two or more processors 11 at the same time or successively. One or more chips may also be mounted on processor 11. Note that the program may also be transmitted from a network via a telecommunication line.

Memory 12 is a computer-readable recording medium, and may also be constituted by at least one of, for example, a read only memory (ROM), an erasable programmable ROM (EPROM), an electrically erasable programmable ROM (EEPROM), a random access memory (RAM), and the like. Memory 12 may also be referred to as a register, a cache, a main memory (main storage unit), or the like. Memory 12 can store a program (program code), a software module, and the like that can be executed to perform a flight control method according to an embodiment of the present invention.

Storage 13 is a computer-readable recording medium, and may also be constituted by at least one of, for example, an optical disk such as a compact disc ROM (CD-ROM), a hard disc drive, a flexible disc, a magneto-optical disc (for example, a compact disc, a digital versatile disc, or a Blu-ray (registered trademark) disc), a smart card, a flash memory (for example, a card, a stick, or a key drive), a floppy (registered trademark) disc, a magnetic strip, and the like. Storage 13 may also be referred to as an auxiliary storage unit.

Communication apparatus 14 is hardware (a transmitting and receiving device) for performing communication with a computer via a wired network and/or a wireless network, and is also referred to as, for example, a network device, a network controller, a network card, a communication module, or the like.

Positioning apparatus 15 measures the three-dimensional position of flying object 10. Positioning apparatus 15 is, for example, a global positioning system (GPS) receiver, and measures the current position of flying object 10 based on GPS signals received from a plurality of satellites.

Image capturing apparatus 16 captures an image of the surrounding area of flying object 10. Image capturing apparatus 16 is a camera for example, and performs image capturing using an optical system to form an image on an imaging element. Also, image capturing apparatus 16 may perform image capturing using ultrasonic waves. Image capturing apparatus 16 captures, for example, an image of a predetermined range forward of flying object 10. Note, however, that the direction in which image capturing apparatus 16 captures an image is not limited to the direction forward of flying object 10, and may also be a direction upward, downward, or backward of flying object 10. Furthermore, the image capture direction may also be changed, for example, by rotation of a pedestal that supports image capturing apparatus 16.

Beacon apparatus 17 transmits and receives beacon signals of a predetermined frequency. For example, beacon apparatus 17 transmits beacon signals within a predetermined range at predetermined time intervals. The predetermined range is, for example, a range within a radius of 10 m. Furthermore, beacon apparatus 17 receives a beacon signal transmitted by another flying object 10. The beacon signal contains an identifier of flying object 10 that has transmitted the beacon signal.

Furthermore, the apparatuses such as processor 11 and memory 12 are connected to each other via bus 18 for communicating information. Bus 18 may be constituted by a single bus, or may be constituted by buses that are different from each other between the apparatuses.

Figure 4:
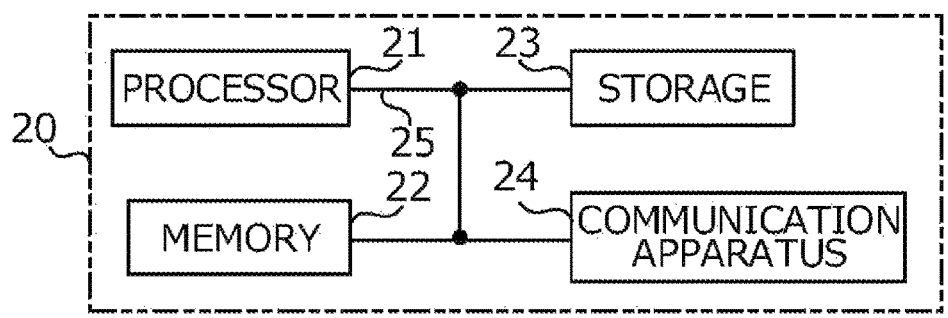
FIG. 4 is a diagram showing a hardware configuration of server apparatus 20 in accordance with the present invention.

FIG. 4 is a diagram showing a hardware configuration of server apparatus 20. Server apparatus 20 functions to perform operation management with respect to flying object 10. The term "operation management" means managing air traffic of flying object 10. For example, if flying object 10 is an unmanned aerial vehicle such as a drone, the operation management includes setting of a flight airspace of flying object 10 and control of a flight path thereof. Note, however, that "operation management" is an idea that can encompass not only management of such an unmanned aerial vehicle but also air traffic management of a manned aerial vehicle, namely, keeping track of and performing notification of the entire airspace in which the manned aerial vehicle flies, for example.

Server apparatus 20 may also be physically constituted by a computer device that includes processor 21, memory 22, storage 23, communication apparatus 24, bus 25, and the like. Processor 21, memory 22, storage 23, communication apparatus 24, and bus 25 are the same as above-described processor 11, memory 12, storage 13, communication apparatus 14, and bus 18, and thus descriptions thereof are omitted.

Figure 5:
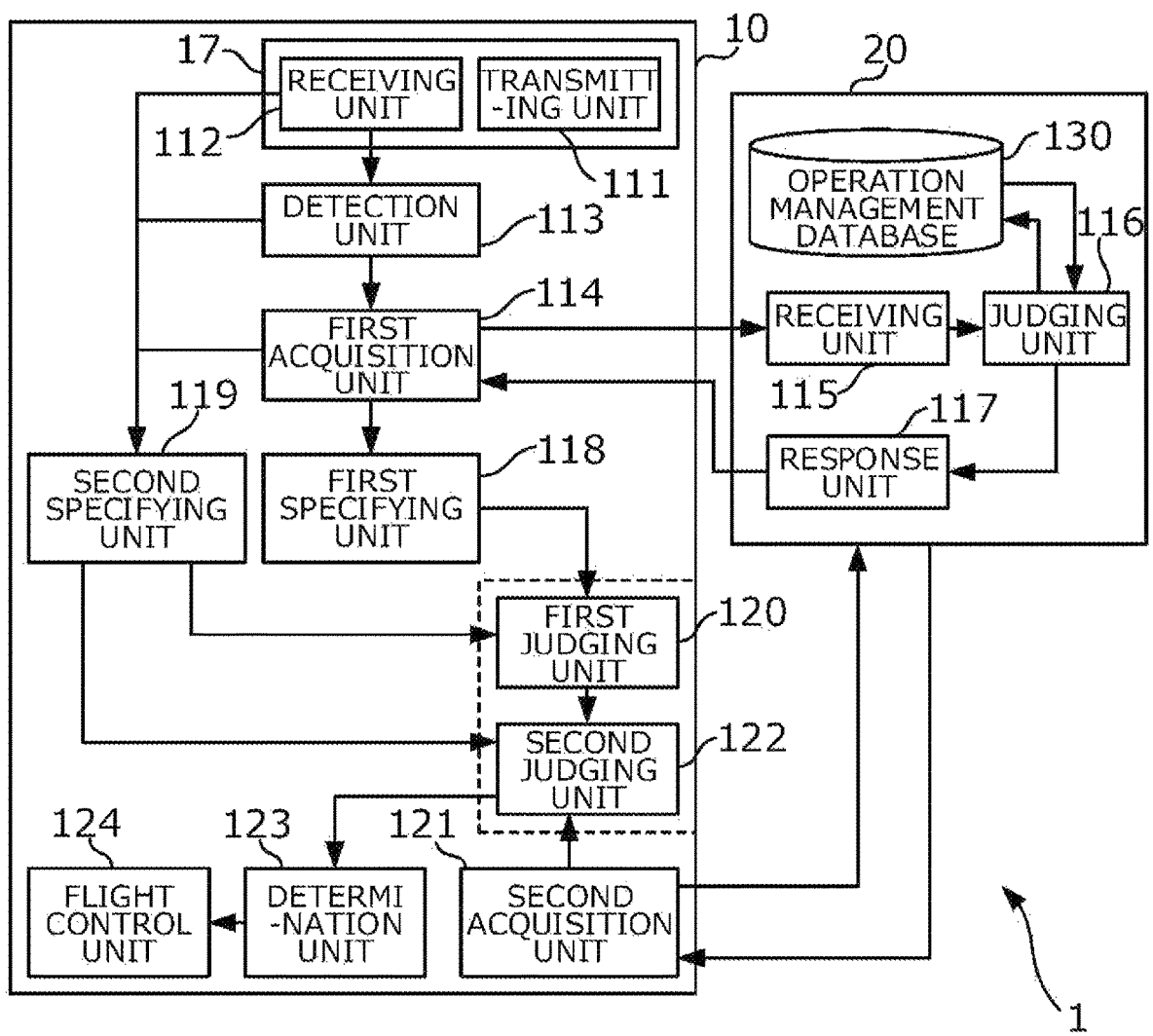
FIG. 5 is a diagram showing an example of a functional configuration of flight control system 1 in accordance with the present invention.

FIG. 5 is a diagram showing an example of a functional configuration of flight control system 1. In this example, flying object 10 functions as transmitting unit 111, receiving unit 112, detection unit 113, first acquisition unit 114, first specifying unit 118, second specifying unit 119 (an example of a specifying unit), first judging unit 120, second acquisition unit 121 (an example of an acquisition unit), second judging unit 122, determination unit 123, and flight control unit 124. Note that first judging unit 120 and second judging unit 122 together function as an example of a judging unit. Transmitting unit 111 and receiving unit 112 are realized by beacon apparatus 17. Other functions are realized as a result of predetermined software (a program) being read onto hardware such as processor 11 or memory 12, and processor 11 performing calculation to control communication using communication device 14, and reading and/or writing of data from/to memory 12 and storage 13. In this example, flying object 10 functions as a flight control apparatus. Furthermore, server device 20 functions as receiving unit 115, judging unit 116, and response unit 117. These functions are realized as a result of predetermined software (a program) being read onto hardware such as processor 21 or memory 22, and processor 21 performing calculation to control communication using communication device 24, and reading and/or writing of data from/to memory 22 and storage 23.

Transmitting unit 111 transmits an identification signal within a predetermined range from flying object 10. The identification signal is a signal for identifying flying object 10. For example, the identification signal is a beacon signal that contains an identifier of flying object 10.

Receiving unit 112 receives an identification signal from another flying object 10. The identification signal is a signal for identifying the other flying object 10. For example, the identification signal is a beacon signal that contains an identifier of the other flying object 10.

Detection unit 113 detects another flying object 10 that is present within a predetermined range from flying object 10. Detection may also be performed based on, for example, whether or not any identification signal has been received from another flying object 10.

First acquisition unit 114 acquires, if another flying object 10 is under given management, a flight plan of the other flying object 10, a priority of the flight purpose of the flight plan, and status information indicating the flight status of the other flying object 10, from server device 20. The term " . . . is under given management" means that the flight of the flying object is managed by, for example, a predetermined organization using server device 20. For example, first acquisition unit 114 sends a request to server device 20 and inquires whether or not another flying object 10 is under given management. Receiving unit 115 receives this request from flying object 10. Judging unit 116 judges whether or not another flying object 10 is under given management with reference to operation management database 130.

FIG. 6 is a diagram showing an example of operation management database 130. Operation management database 130 is stored in, for example, storage 23. In operation management database 130, the identifier of each flying object 10, a flight plan of the flying object 10, and a priority of the flight purpose of the flight plan are stored in association with each other. Operation management database 130 only includes the identifiers of flying objects 10 that are under given management. In other words, operation management database 130 does not include the identifier of flying object 10 that is not under given management.

"Flight plan" means information that indicates a flight plan. "Flight plan" describes a departure place, a stopover place, a destination place, a flight path, estimated time of departure, estimated time of arrival, and a flight speed of flying object 10. Note that, if an airspace in which the flying object 10 flies is divided into a plurality of three-dimensional spaces (hereinafter, referred to as "airspace cells"), a departure place, a stopover place, a destination place, and a flight path may be indicated by one or more airspace cells. Estimated time of departure and estimated time of arrival indicate the flight time. For example, the time period from estimated time of departure to estimated time of arrival is the flight time. The priority of the flight purpose indicates the degree of priority of the flight purpose. For example, if flying object 10 flies to deliver packages, the priority may be higher the higher the importance of the packages or urgency of delivery is. In another example, if flying object 10 flies to respond to an incident or accident, the priority may be higher. In the example shown in FIG. 6, the priority is expressed as a numeric character from "1" to "3". Priority "1" indicates that the flight has the highest priority, and priority "3" indicates that the flight has the lowest priority. Note, however, that the expression of priority is not limited to this example. Priorities may also be expressed using symbols other than numeric characters.

Response unit 117 transmits, to flying object 10, a response indicating a result of judging conducted by judging unit 116. Furthermore, if it is judged by judging unit 116 that another flying object 10 is under given management, the response will include the flight plan of the other flying object 10, the priority of the flight purpose of this flight plan, and status information that indicates the flight status of the other flying object 10.

First specifying unit 118 specifies the class of the other flying object 10 detected by detection unit 113. The specification of a class may be performed based on, for example, a response transmitted from response unit 117. In this context, "class" refers to a distinction based on the type that corresponds to the management status and flight status of flying object 10. Class examples include first to third classes. First class is a class to which flying object 10 that is not under given management belongs. Second class is a class to which flying object 10 that is under given management and is flying according to a flight plan belongs. Third class is a class to which flying object 10 that is under given management but is not flying according to the flight plan belongs.

Second specifying unit 119 specifies a moving direction in which the other flying object 10 detected by detection unit 113 is moving. Specification of a moving direction may be performed based on, for example, a change in the intensity of the identification signal received by receiving unit 112 from the other flying object 10, or may be performed based on the flight plan of the other flying object 10 acquired by first acquisition unit 114.

First judging unit 120 judges, based on movement information of the other flying object 10, the likelihood that flying object 10 and the other flying object 10 will collide with each other. The movement information refers to information regarding movement of the other flying object 10. The movement information may include information that indicates at least one of, for example, a moving direction, a moving speed, and a moving path of the other flying object 10. Also, different information may also be used as the movement information depending on the class of the other flying object 10 specified by first specifying unit 118. For example, if the first class or the third class is specified by first specifying unit 118, information indicating the moving direction specified by second specifying unit 119 may be used as the movement information. On the other hand, if the second class is specified by first specifying unit 118, the flight plan acquired by first acquisition unit 114 may be used as the movement information.

Typically, a flight plan of flying object 10 is prepared such that collision with another flying object 10 is avoided. Accordingly, if flying object 10 and another flying object 10 are flying according to their flight plans, the two flying objects 10 essentially will not collide with each other. However, for example, if the flight purpose of flying object 10 shows urgency, namely, if a situation, such as a malfunction of flying object 10, that could not be predicted in a prior flight plan occurs, it may be determined that there is a likelihood of collision with another flying object 10.

Second acquisition unit 121 acquires attribute information that indicates the attribute of an airspace in which flying object 10 is flying. The attribute information may be acquired from, for example, server device 20. In this case, first acquisition unit 114 requests server device 20 to transmit attribute information that includes position information indicating the position measured by positioning apparatus 15, and server device 20 may transmit, in response to the transmission request, attribute information indicating the attribute of an airspace in which flying object 10 is flying, to flying object 10. The attribute information may include, for example, information indicating the size of an airspace cell in which flying object 10 is currently flying, information indicating whether or not passing is allowed in this airspace cell, or information indicating whether or not a margin space is added to the airspace cell. The term "margin space" means a remaining space provided between airspace cells, other than the required space. This margin space may be provided inside airspace cells, or may be provided between one airspace cell and another airspace cell. The acquisition of attribute information may be performed when, for example, it is judged by first judging unit 120 that there is a likelihood of collision, or may be performed at predetermined time intervals.

Each airspace cell has an attribute set in advance. For example, whether or not passing is allowed in an airspace cell may be set based on the safety degree required for that airspace. For example, if the safety degree required for an airspace cell is higher than a predetermined safety degree, the airspace cell may have an attribute set such that passing is not allowed.

Second judging unit 122 judges whether or not passing is possible, based on the moving direction specified by second specifying unit 119. If, for example, the moving direction specified by second specifying unit 119 corresponds to the moving direction of flying object 10, it may be determined that passing is possible. This is because, if the moving direction of flying object 10 is completely different from the moving direction of another flying object 10, a passing operation cannot be performed. The term "the moving direction corresponds to the moving direction" means that flying objects have a common moving direction, e.g., the same moving direction. Note, however, that moving directions that correspond to each other may be slightly different as long as they are substantially the same moving direction. Furthermore, second judging unit 122 may judge whether or not passing is possible, based on the moving direction specified by second specifying unit 119 and the attribute information acquired by second acquisition unit 121. For example, it may be determined that passing is possible if the moving direction specified by second specifying unit 119 corresponds to the moving direction of flying object 10, and the attribute indicated by the attribute information acquired by second acquisition unit 121 satisfies a predetermined condition. "Predetermined condition" refers to, for example, a condition under which it is conceivable that a passing operation will not cause an issue. If, for example, the size of an airspace cell is a predetermined size or larger, or a margin space is added to an airspace cell, there is a low likelihood of collision between flying objects 10 even if a passing operation is performed, and thus it may be determined that the predetermined condition is satisfied. Furthermore, if passing is allowed in an airspace cell, it may be determined that the predetermined condition is satisfied.

Determination unit 123 determines, based on a relationship between flying object 10 and another flying object 10, content of a passing operation to be performed with respect to the other flying object 10. The content may include at least one of, for example, a change in the flight speed and a change in the flight path. For example, content of the passing operation may be determined, based on the routes of flying object 10 and another flying object 10 or a difference in the flight speed between the two flying objects 10, such that flying object 10 does not collide with the other flying object 10. The route and the flight speed of the other flying object 10 may be specified based on, for example, the flight plan of the other flying object 10 acquired by first acquisition unit 114, or may be estimated based on the moving direction of the other flying object 10 specified by second specifying unit 119. Note that, in the passing operation, flying object 10 may pass the other flying object 10 on the left side or right side thereof, or may pass the other flying object 10 on the upper side or lower side thereof. Furthermore, depending on the relationship between flying object 10 and another flying object 10, determination unit 123 may determine content of an operation of allowing the other flying object 10 to pass. The content may include at least one of, for example, a change in the flight speed and a change in the flight path. The operation of allowing the other flying object 10 to pass may be determined so that a passing operation to be performed by the other flying object 10 is not hindered, based on the routes of flying object 10 and the other flying object 10 or a difference in the flight speeds between the two flying objects 10.

Flight control unit 124 typically controls drive apparatuses 102 so that flying object 10 flies according to a predetermined flight plan. Under the control of flight control unit 124, drive apparatuses 102 rotate propellers 101 so that flying object 10 flies. Note, however, that, if it is judged by first judging unit 120 that there is a likelihood of collision, and it is judged by second judging unit 122 that passing is possible, flight control unit 124 controls the flight of flying object 10 to perform a passing operation according to the content determined by determination unit 123. The term "passing" means that a flying object comes from behind and moves forward in front of another flying object. Passing includes not only moving forward in front of another object while changing route but also moving forward in front of another object without changing the route, that is, overtaking. Furthermore, flight control unit 124 may perform a passing operation if the flight status of flying object 10 or another flying object 10 satisfies a predetermined first condition, and may perform an operation of allowing the other flying object 10 to pass, if the flight status of flying object 10 or the other flying object 10 satisfies a predetermined second condition. The flight status may include, for example, a flight purpose or a flight speed.

Note that, in the following description, if flying object 10 is described as the subject of processing, it is meant that the processing is executed specifically by reading predetermined software (program) onto hardware such as processor 11 or memory 12 so that processor 11 performs calculation, and controlling communication using communication apparatus 14 and reading and/or writing of data with respect to memory 12 and storage 13. The same applies to server apparatus 20.

Figure 7:
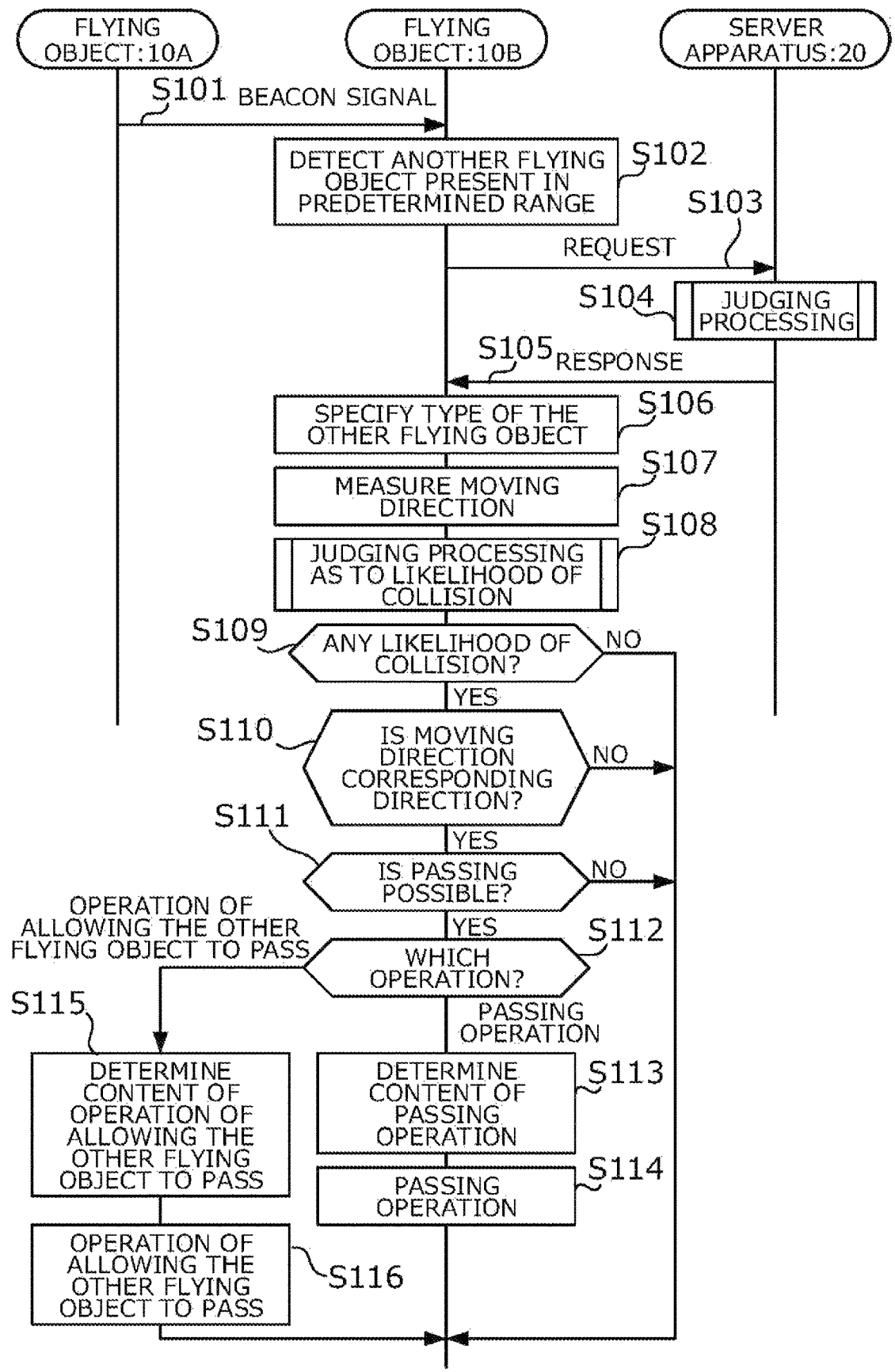
FIG. 7 is a sequence chart showing an example of an operation of flight control system 1 in accordance with the present invention.

FIG. 7 is a sequence chart showing an example of an operation of flight control system 1. Here, a case is assumed in which a plurality of flying objects 10 include flying objects 10A and 10B. For each flying object 10, a flight plan and a priority of the flight purpose of flying object 10 that are stored in operation management database 130 are distributed from server device 20 before flight, and are stored in storage 13. Also, each flying object 10 flies according to a flight plan. For example, the flight plan and the priority of the flight purpose stored in operation management database 130 shown in FIG. 6 in association with the identifier "D002" of flying object 10B are stored in storage 13 of flying object 10B. According to the flight plan, flying object 10B takes off from departure place "P4" at estimated time of departure "T3", flies along flight path "R2" at flight speed "V2" via stopover place "P5", and arrives at destination place "P6" at estimated time of arrival "T4".

Furthermore, each flying object 10 measures, while flying, the current position at predetermined time intervals using positioning apparatus 15, and transmits position information indicating the measured current positions to server device 20. Server device 20 recognizes the flight status of each flying object 10, based on position information received from flying object 10 and the flight plan of flying object 10 included in operation management database 130.

Furthermore, each flying object 10 transmits, while flying, beacon signals from transmitting unit 111 at predetermined time intervals. Here, a case is assumed in which flying object 10A is present within a predetermined range from flying object 10B. In this case, a beacon signal transmitted from flying object 10A reaches flying object 10B.

In step S101, receiving unit 112 of flying object 10B receives the beacon signal transmitted from another flying object 10A that is present within a predetermined range. The beacon signal contains identifier "D001" of flying object 10A.

In step S102, detection unit 113 of flying object 10B detects the other flying object 10A that is present in the predetermined range, since the beacon signal received in step S101 contains identifier "D001" of flying object 10A.

In step S103, first acquisition unit 114 of flying object 10B sends a request to server device 20 and inquires whether or not the other flying object 10A detected in step S102 is under given management. This request contains identifier "D001" contained in the beacon signal received in step S101. Receiving unit 115 of server device 20 receives this request from flying object 10B.

In step S104, judging unit 116 of server device 20 performs processing for judging whether or not flying object 10A is under given management, with reference to operation management database 130. Specifically, judging unit 116 judges whether or not the identifier contained in the request is contained in operation management database 130.

If, for example, identifier "D001" of flying object 10A is not contained in operation management database 130, it is judged that flying object 10A is not under given management. On the other hand, in the example shown in FIG. 6, identifier "D001" of flying object 10A is contained in operation management database 130. In this case, it is judged that flying object 10A is under given management.

Furthermore, if it is judged that flying object 10A is under given management, status information that indicates the flight status of flying object 10A is generated. The status information is, for example, information that indicates whether or not flying object 10A is flying according to the flight plan, and is generated based on the position information received from flying object 10A and the flight plan of flying object 10A contained in operation management database 130.

In the example shown in FIG. 6, if the position information received from flying object 10A indicates a position on flight path "R1", it is judged that flying object 10A is flying according to the flight plan. In this case, status information that indicates that flying object 10A is flying according to the flight plan is generated. On the other hand, if the position information received from flying object 10A indicates a position away from flight path "R1", it is judged that flying object 10A is not flying according to the flight plan. In this case, status information that indicates that flying object 10A is not flying according to the flight plan is generated.

In step S105, response unit 117 of server device 20 transmits, to flying object 10B, a response to the request received in step S103. The response includes a result of the judgement made in step S104. Furthermore, if it is judged that flying object 10A is under given management, this response further contains the flight plan of flying object 10A, the priority of the flight purpose of this flight plan, and status information that indicates the flight status of flying object 10A. For example, if flying object 10A is under given management and is flying according to the flight plan, a response that contains the judgement result that flying object 10A is under given management, the flight plan and priority "2" of the flight purpose that are associated with identifier "D001" of flying object 10A in operation management database 130 shown in FIG. 6, and the status information that indicates that flying object 10A is flying according to the flight plan is transmitted to flying object 10B. First acquisition unit 114 of flying object 10B receives the response from server device 20. The flight plan, the priority of the flight purpose, and the status information of flying object 10A that are contained in this response are stored in storage 13 of flying object 10B.

In step S106, first specifying unit 118 of flying object 10B specifies the class of the other flying object 10A, based on the response received from server device 20 in step S105. For example, if this response contains a judgement result that flying object 10A is not under given management, the class of flying object 10A is specified as the first class. On the other hand, if the response received in step S105 contains a judgement result that flying object 10A is under given management and status information indicating that flying object 10A is flying according to the flight plan, the class of flying object 10A is specified as the second class. Also, if the response received in step S105 contains a judgement result that flying object 10A is under given management and status information indicating that flying object 10A is not flying according to the flight plan, the class of flying object 10A is specified as the third class.

In step S107, second specifying unit 119 of flying object 10B measures the moving direction of the other flying object 10A when viewed from flying object 10B, based on a change in the intensity of beacon signals received from flying object 10A. As long as flying object 10A is within a predetermined range from flying object 10B, beacon signals are received from flying object 10A at predetermined time intervals. If, for example, the intensity of the beacon signals received from flying object 10A increases, a direction in which flying object 10A approaches flying object 10B is measured. On the other hand, if the intensity of the beacon signals received from flying object 10A decreases, a direction in which flying object 10A moves away from flying object 10B is measured.

In step S108, first judging unit 120 of flying object 10B performs processing for judging the likelihood that the other flying object 10A will collide with flying object 10B. This method for judging the likelihood of collision depends on the class of flying object 10A specified in step S106.

FIG. 8 is a diagram showing an example of the method for judging the likelihood of collision. In this example, in a case where flying object 10A belongs to the first class or the third class, it is judged that there is a likelihood of collision if the moving direction measured in step S107 is the direction in which flying object 10A approaches flying object 10B. On the other hand, in the same case, it is judged that there is no likelihood of collision if the moving direction measured in step S107 is the direction in which flying object 10A moves away from flying object 10B.

In a case where flying object 10A belongs to the second class, it is judged that there is a likelihood of collision if the flight plans of flying object 10A and flying object 10B stored in storage 13 describe flight paths that overlap each other at the same time. On the other hand, in the same case, it is judged that there is no likelihood of collision if the flight plans of flying object 10A and flying object 10B stored in storage 13 describe flight paths that do not overlap each other at the same time.

In the example shown in FIG. 6, if flight path "R1" described in the flight plan of flying object 10A and flight path "R2" described in the flight plan of flying object 10B overlap each other at the same time, it is judged that there is a likelihood of collision. The term "flight paths overlap each other" means that at least part of the flight paths overlap each other. The idea of overlap of flight paths includes a state in which the flight paths match each other, a state in which the flight paths partially match each other, and a state in which the flight paths cross each other. Furthermore, if a flight path is expressed as a plurality of consecutive airspace cells, the idea of overlap of flight paths will include a state in which flying objects are scheduled to fly through the same airspace cell at the same time. On the other hand, if the flight plans of flying object 10A and flying object 10B describe flight paths that do not overlap each other at the same time, it is judged that there is no likelihood of collision.

In step S109, first judging unit 120 of flying object 10B judges whether or not there is a likelihood that the other flying object 10A will collide with flying object 10B. If, in step S108 above, it is judged that there is a likelihood of collision (the judgement in step S109 results in YES), the procedure advances to step S110. On the other hand, if, in step S108 above, it is judged that there is no likelihood of collision (the judgement in step S109 results in NO), the processing is ended.

In step S110, second judging unit 122 of flying object 10B judges whether or not the moving direction of flying object 10B corresponds to the moving direction of flying object 10A. If, for example, flying object 10B is moving from south to north, and the moving direction indicated by the flight plan of flying object 10A or specified by second specifying unit 119 is a direction from south to north, it is judged that the moving direction of flying object 10B corresponds to the moving direction of flying object 10A. If it is judged that the moving direction of flying object 10B corresponds to the moving direction of flying object 10A (the judgement in step S110 results in YES), the procedure advances to step S111. On the other hand, if it is judged that the moving direction of flying object 10B does not correspond to the moving direction of flying object 10A (the judgement in step S110 results in NO), the processing is ended.

In step S111, second judging unit 122 of flying object 10B judges whether or not passing is possible, based on the attribute of the airspace cell in which flying object 10B is currently flying. The attribute of the airspace cell is, for example, an attribute indicated by the attribute information acquired by second acquisition unit 121 from server device 20. It is assumed here that the attribute information includes information indicating the size of the airspace cell in which flying object 10B is currently flying, information indicating whether or not passing is allowed in this airspace cell, and information indicating whether or not a margin space is added to the airspace. In this case, if the attribute information of flying object 10B indicates that the size of the airspace cell in which it is currently flying is a predetermined size or larger, passing is allowed in this airspace cell, and a margin space is added to the airspace, it may be determined that passing is possible. If it is judged that passing is possible (the judgement in step S111 results in YES), the procedure advances to step S112. On the other hand, if the attribute information of flying object 10B indicates that the size of the airspace cell in which it is currently flying is smaller than the predetermined size, passing is not allowed in this airspace cell, or no margin space is added to the airspace, it may be determined that passing is not possible. If it is judged that passing is not possible (the judgement in step S111 results in NO), the processing is ended.

In step S112, determination unit 123 of flying object 10B determines, based on the flight status of flying object 10B or the other flying object 10A, whether or not flying object 10B will perform a passing operation or an operation of allowing the other flying object 10A to pass. If, as shown in FIG. 6, for example, the priority of the flight purpose of flying object 10B is higher than the priority of the flight purpose of the other flying object 10A, it may be determined that flying object 10B is to perform a passing operation. On the other hand, if the priority of the flight purpose of flying object 10B is lower than the priority of the flight purpose of the other flying object 10A, it may be determined that flying object 10B is to perform an operation of allowing the other flying object 10A to pass. In another example, if the flight speed of flying object 10B is higher than the flight speed of flying object 10A, it may be determined that flying object 10B is to perform a passing operation. On the other hand, if the flight speed of flying object 10B is lower than the flight speed of the other flying object 10A, it may be determined that flying object 10B is to perform an operation of allowing the other flying object 10A to pass. If it is determined that flying object 10B is to perform a passing operation, the procedure advances to step S113.

In step S113, determination unit 123 of flying object 10B determines content of the passing operation. For example, content is determined such that flying object 10B increases its flight speed to be higher than the flight speed of the other flying object 10A, and flies on a flight path such that it flies at a predetermined distance from the other flying object 10A. More specifically, this flight path is a flight path on which flying object 10B passes through a position located at a predetermined distance from the route of the other flying object 10A defined based on the flight plan or the moving direction of the other flying object 10A, and moves forward in front of the other flying object 10A.

In step S114, flight control unit 124 of flying object 10B performs the passing operation with respect to the other flying object 10A in accordance with the content determined in step S113. Note that, after having passed the other flying object 10A, flying object 10B may fly according to the flight plan.

On the other hand, if, in step S112 above, it is determined that flying object 10B is to perform an operation of allowing the other flying object 10A to pass, the procedure advances to step S115.

In step S115, determination unit 123 of flying object 10B determines content of the operation of allowing the other flying object 10A to pass. For example, content is determined such that flying object 10B temporarily changes its flight path so as to deviate from the route of the other flying object 10A, and flies while reducing its flight speed to be lower than the flight speed of the other flying object 10A.

In step S116, flight control unit 124 of flying object 10B performs the operation of allowing the other flying object 10A to pass in accordance with the content determined in step S115. This operation of allowing the other flying object 10A to pass is performed until the other flying object 10A has passed flying object 10B. In other words, after having been passed by the other flying object 10A, flying object 10B may fly according to the flight plan.

According to the above-described embodiment, since content of a passing operation to be performed with respect to another flying object 10 is determined based on the relationship between flying object 10 and the other flying object 10, it is possible to safely pass the other flying object 10. Furthermore, since a passing operation is performed when there is a likelihood of collision with another flying object 10, it is possible to avoid a collision with the other flying object 10. Furthermore, since a passing operation is performed only when the moving direction of another flying object 10 corresponds to the moving direction of flying object 10, it is possible to prevent a passing operation with respect to another flying object 10 that is moving in a direction different from that of flying object 10. Furthermore, since it is judged whether or not passing is possible based on the attribute of an airspace in which flying object 10 is flying, it is possible to prevent a passing operation if flying object 10 is flying in an airspace for which passing is not suitable. Furthermore, since it is judged that passing is possible if passing is allowed in an airspace in which flying object 10 is flying, the size of the airspace is a predetermined size or larger, and a margin space is added to the airspace, flying object 10 can be prevented from colliding with the other flying object 10 when performing a passing operation. Furthermore, since, as content of a passing operation, content is determined such that flying object 10 flies at a predetermined distance from the other flying object 10, flying object 10 can smoothly perform the passing operation. Furthermore, since it is determined, based on the flight status of flying object 10 or another flying object 10, whether flying object 10 performs a passing operation or an operation of allowing the other flying object to pass, flying object 10 can pass the other flying object 10 or allow the other flying object 10 to pass, depending on the flight status.

The present invention is not limited to the above-described embodiment. The above-described embodiment may also be modified in the following manner. Furthermore, two or more modifications below may also be executed in combination.

In the above-described embodiments, determination unit 123 may determine content of a passing operation, based on at least either of weights and performances of flying object 10 and another flying object 10. For example, when flying object 10B performs a passing operation with respect to another flying object 10A, and the weight of the other flying object 10A is greater than the weight of flying object 10B, content that contains acceleration for example, may be determined as content of the passing operation of flying object 10B. In this case, the other flying object 10A may fly without changing its speed. The same content of the passing operation may also be determined if the maximum flight speed of flying object 10B is larger than the maximum flight speed of flying object 10A.

In contrast, when flying object 10B performs an operation of allowing the other flying object 10A to pass, and the weight of flying object 10B is greater than the weight of the other flying object 10A, content that includes not changing the speed may be determined as content of the operation of flying object 10B allowing the other flying object 10A to pass. In other words, content of a passing operation and content of an operation of allowing the other flying object to pass may be determined so that the one of flying object 10 and the other flying object 10 that has the larger weight undergoes a smaller change in the flight speed. The same content of the operation of allowing the other flying object to pass may also be determined if the maximum flight speed of flying object 10B is lower than the maximum flight speed of the other flying object 10A. In other words, content of a passing operation and content of an operation of allowing the other flying object to pass may be determined so that the one of flying object 10 and the other flying object 10 that has the larger maximum flight speed undergoes a smaller change in the flight speed.

Flying object 10 tends to consume more electric power when the flight speed is changed the heavier it weights. Accordingly, if flying object 10 with a lower weight changes its flight speed, and flying object 10 with a larger weight does not change its flight speed, overall electric power consumption may be small. Furthermore, flying object 10 tends to consume less electric power when the flight speed is changed the higher its performance is. Accordingly, if flying object 10 with higher performance changes its flight speed, and flying object 10 with lower performance does not change its flight speed, overall electric power consumption may be small. According to this modification, a more appropriate passing operation can be performed taking into consideration the weight of flying objects 10, the performance thereof, or a combination of the weights and the performances.

In the above-described embodiment, if there are a plurality of other flying objects 10 to be subjected to passing operations, flying object 10 may perform the passing operations with respect to the other flying objects 10 one by one. In this case, the passing operations are performed as many times as the number of other flying objects 10 to be subjected to passing operations. In another example, flying object 10 may regard the other flying objects 10 as a group of flying objects 10, and may perform a passing operation with respect to the group of flying objects 10. In this case, the passing operation is performed only once. In another example, if there are other flying objects 10 to be subjected to one or more passing operations, flying object 10 does not need to perform any passing operations.

In the above-described embodiment, after having performed the passing operation, flying object 10 may perform return operation of returning to the original flight state, depending on the size of the airspace cell in which flying object 10 is flying, or the number of flying objects 10 that are flying in the same airspace cell. The return operation includes an operation of changing the flight path or the flight speed to the original one. For example, if the size of the airspace cell in which flying object 10 is flying is a predetermined size or larger, or the number of flying objects 10 flying in the same airspace cell is a predetermined number or less, flying object 10 does not need to perform any return operation.

In the above-described embodiment, a plurality of flying objects 10 may encompass flying object 10 such as a bird that does not transmit a beacon signal. In other words, flying objects 10 may include any object as long as it can fly such as, in addition to an unmanned aerial vehicle such as a drone, a manned aerial vehicle, and a flying animal such as a bird. In this case, a device other than beacon apparatus 17 may be used to detect another flying object 10 present within a predetermined range from flying object 10. For example, image capturing apparatus 16 of flying object 10 may be used, together with or in place of beacon apparatus 17, to detect another flying object 10. In this case, an image captured by image capturing apparatus 16 of flying object 10 is subjected to image recognition. If, as a result of the image recognition, another flying object 10 is recognized in the image, the other flying object 10 present within the predetermined range may be detected. In another example, an ultrasonic sensor may be used, together with or in place of beacon apparatus 17, to detect another flying object 10 present within a predetermined range from flying object 10. According to this modification, it is possible to also detect flying object 10 such as a bird that does not transmit a beacon signal.

Furthermore, if the beacon apparatus 17 and a device other than beacon apparatus 17 are used to detect another flying object 10 present within a predetermined range from flying object 10, and the other flying object 10 is detected only by the device other than beacon apparatus 17, first specifying unit 118 may specify the class of the other flying object 10 as the first class. In other words, if a condition that no beacon signal is transmitted from the other flying object 10 and the other flying object 10 is detected by the device other than beacon apparatus 17 is satisfied, first specifying unit 118 may specify the class of the other flying object 10 as the first class. According to this modification, it is possible to also avoid a collision with flying object 10 such as a bird that does not transmit a beacon signal.

In the above-described embodiment, flying object 10 may stop in mid-air in an operation of allowing the other flying object 10 to pass. If, in this way, flying object 10 stops in mid-air, flying object 10 may transmit a stop signal. This stop signal may be transmitted from, for example, beacon apparatus 17. Upon receiving a stop signal from preceding flying object 10, subsequent flying object 10 may fly so as to avoid preceding flying object 10.

In the above-described embodiment, first judging unit 120 may judge, instead of whether or not there is a likelihood of collision, how high a likelihood of collision is. In this case, if the likelihood of collision judged by first judging unit 120 is a predetermined value or more, and it is judged by second judging unit 122 that passing is possible, flight control unit 124 may control the flight of flying object 10 to perform a passing operation in accordance with the content determined by determination unit 123. In other words, even if it is judged by first judging unit 120 that there is a likelihood of collision, flight control unit 124 does not need to perform a passing operation if the likelihood of collision is smaller than the predetermined value.

In the above-described embodiment, the priority of a flight purpose may be contained in a beacon signal. In this case, determination unit 123 may determine, using the priority of the flight purpose contained in the beacon signal received by receiving unit 112, whether to perform a passing operation with respect to another flying object 10 or to perform an operation of allowing the other flying object 10 to pass.

In the above-described embodiment, the method for determining whether or not the moving direction of flying object 10 corresponds to the moving direction of another flying object 10 is not limited to the method described in the embodiment. For example, a plurality of successive images captured by image capturing apparatus 16 are subjected to image recognition, and if, as a result of the image recognition, another flying object 10 is recognized in a given direction and the area in the image of the other flying object 10 does not increase relative to the moving speed of the flying object 10, it may also be determined that the moving direction of flying object 10 corresponds to the moving direction of the other flying object 10. In another example, if the attribute indicated by attribute information acquired by second acquisition unit 121 is an attribute set such that only one directional movement is allowed, it is conceivable that the moving direction of flying object 10B and the moving direction of flying object 10A are substantially the same. Accordingly, in this case, it may also be determined that the moving direction of flying object 10B corresponds to the moving direction of flying object 10A.

In the above-described embodiment, the method for measuring the position of flying object 10 is not limited to a method using a GPS. The position of flying object 10 may also be measured using a method in which a GPS is not used.

In the above-described embodiment, irrespective of a request from flying object 10, it may be judged at predetermined time intervals whether or not each flying object 10 is flying according to a flight plan, and status information may be generated based on a result of the judgement. In this case, operation management database 130 shown in FIG. 6 includes the status information indicating whether or not each flying object 10 is flying according to the flight plan. Also, if, for example, it is judged by judging unit 116 that flying object 10A is under given management, status information of flying object 10A may be extracted from operation management database 130 and may be transmitted to flying object 10A.

In the above-described embodiments, at least one of the functions of flying object 10 may be implemented in server device 20 or another device. For example, at least one of first specifying unit 118, second specifying unit 119, first judging unit 120, second judging unit 122, and determination unit 123 may be implemented in server device 20. That is to say, various types of determination, judgement, and specification with respect to passing may be made by server device 20. Similarly, at least one of the functions of server device 20 may be implemented in flying object 10 or another device.

The present invention may also be provided as a flight control method that includes processing steps that are executed in flight control system 1. Furthermore, the present invention may also be provided as a program that is executed in flying object 10 or server apparatus 20.

The block diagram of FIG. 5 shows blocks per functional units. These functional blocks (configuration units) are realized by an arbitrary combination of hardware and/or software. Furthermore, means for realizing the functional blocks is not particularly limited. In other words, the functional blocks may also be realized by one physically and/or logically coupled apparatus, or a plurality of apparatuses obtained by directly and/or indirectly (for example, in a wired and/or wireless manner) connecting two or more apparatuses that are physically and/or logically separated.

The hardware configuration of flying object 10 or server apparatus 20 may also be configured to include one or more apparatuses shown in FIG. 3 or 4, or may also be configured not to include some apparatuses. Furthermore, flying object 10 or server apparatus 20 may also be configured to include hardware such as a microprocessor, a Digital Signal Processor (DSP), an Application Specific Integrated Circuit (ASIC), a Programmable Logic Device (PLD), or a Field Programmable Gate Array (FPGA), and some or all of the functional blocks of flying object 10 or server apparatus 20 may also be realized by the hardware. For example, processor 11 or 21 may also be implemented by at least one of these pieces of hardware.

Notification of information is not limited to the aspects/embodiments explained in the present description, and may also be performed by another method. For example, notification of information may also be performed by physical layer signaling (for example, downlink control information (DCI) or uplink control information (UCI)), higher-level layer signaling (for example, radio resource control (RRC) signaling, medium access control (MAC) signaling, broadcast information (master information block (MIB) or system information block (SIB))), and other signals, or a combination thereof. Furthermore, RRC signaling may also be referred to as an RRC message, and may also be, for example, an RRC Connection Setup message, an RRC Connection Reconfiguration message, or the like.

The aspects/embodiments explained in the present description may also be applied to a system using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wide Band (UWB), Bluetooth (registered trademark) or another appropriate system, and/or a next-generation system expanded based on them.

The orders of the processing procedure, sequence, flowchart, and the like of the aspects/embodiments described in the present description may be changed unless they contradict each other. For example, the methods explained in the present description show various step elements in an exemplified order, and are not limited to the shown specific order.

Information and the like may be output from a higher-level layer (or a lower-level layer) to a lower-level layer (or a higher-level layer). Information and the like may also be input/output via a plurality of network nodes.

Input/output information and the like may also be stored in a specific location (for example, a memory), or may also be managed in a management table. Information and the like to be input/output may be overwritten, updated, or added. Output information and the like may also be deleted. Input information and the like may also be transmitted to another apparatus.

Judgment may also be conducted using a value expressed by a single bit (0 or 1) or a truth-value (Boolean: true or false), or by comparing numerical values (for example, comparing a value with a predetermined value).

The aspects/embodiments explained in the present description may also be used alone or in combination, or may also be switched when they are implemented. Furthermore, notification of predetermined information (for example, notification of "being X") is not limited to being performed explicitly, and may also be performed implicitly (for example, notification of the predetermined information is not performed).

Software should be broadly interpreted to mean an instruction, an instruction set, a code, a code segment, a program code, a program, a sub program, a software module, an application, a software application, a software package, a routine, a subroutine, an object, an executable file, an execution thread, a procedure, a function and the like, regardless of whether it is referred to as software, firmware, middleware, a microcode, a hardware description language, or another name.

Furthermore, software, an instruction, and the like may also be transmitted/received via a transmission medium. For example, if software is transmitted from a web site, a server, or another remote source, using a wired technology such as a coaxial cable, an optical fiber cable, a twist pair, and a digital subscriber line (DSL), and/or a wireless technology such as infrared light, a radio wave, and a microwave, the definition of the transmission medium will include the wired technology and/or the wireless technology.

Information, signals, and the like described in the present description may also be expressed using any of various different technologies. For example, data, an instruction, a command, information, a signal, a bit, a symbol, a chip, and the like that may be mentioned over the entire description above may also be expressed by an electric voltage, an electric current, an electromagnetic wave, a magnetic field or a magnetic particle, an optical field or a photon, or an arbitrary combination thereof.

Note that the terms described in the present description and/or the terms needed for understanding the present description may also be replaced by terms that have the same or similar meaning. For example, a channel and/or a symbol may also be a signal. Furthermore, a signal may also be a message. Furthermore, a component carrier (CC) may also be referred to as a carrier frequency, a cell, or the like.

The terms "system" and "network" used in the present description can be used in an interchangeable manner.

Furthermore, the information and the parameters explained in the present description may also be expressed by absolute values, relative values from a predetermined value, or another type of corresponding information. For example, a radio resource may also be one indicated by an index.

The names used for the above-described parameters are in no way limiting. Furthermore, there may be a case where formulae and the like using these parameters are different from those explicitly disclosed in the present description. Various channels (such as, for example, a PUCCH and a PDCCH) and information elements (such as, for example, a TPC) can be identified by any suitable name, and thus various names assigned to these various channels and information elements are in no way limiting.

The term "determining" used in the present description may include various types of operations. The term "determining" can include a case where judging, calculating, computing, processing, deriving, investigating, looking up (for example, looking up a table, a data base, or another data structure), or ascertaining is regarded as "determining". Furthermore, the term "determining" can include a case where receiving (for example, receiving information), transmitting (for example, transmitting information), inputting, outputting, or accessing (for example, accessing data in the memory) is regarded as "determining". Furthermore, the term "determining" can include a case where resolving, selecting, choosing, establishing, or comparing is regarded as "determining". In other words, the term "determining" can include a case where some operation is regarded as "determining".

The term "based on" used in the present description does not mean "based on only", unless otherwise noted. In other words, the term "based on" means both terms "based on only" and "based on at least".

Any reference to the elements using designations such as "first" and "second" used in the present description does not limit, in general, the amount or order thereof. These nominal signs can be used in the present description as a convenient method for distinguishing between two or more elements. Accordingly, reference to first and second elements does not mean that only two elements can be used here, or that the first element should precede the second element somehow.

The terms "including", "comprising", and any form thereof are intended to be comprehensive as long as they are used in the present description or the claims, similar to the term "being provided with". Furthermore, the term "or" used in the present description or the claims is intended not to be exclusive OR.

In the entirety of the present disclosure, when articles are added through translation, for example, as "a", "an", and "the" in English, these articles also denote the plural form unless it is clear otherwise from the context.

While the present invention has been described in detail, it would be obvious to those skilled in the art that the present invention is not limited to the embodiments explained in the present description. The present invention can be implemented as corrected and modified aspects without departing from the spirit and scope of the present invention that are defined by the description of the claims. Accordingly, the present description aims to illustrate examples and is not intended to restrict the present invention in any way.

In the above-described embodiment, attribute information of an airspace may also include information on the ground corresponding to the airspace or information indicating whether or not wireless communication is possible in the airspace. If, for example, there is a person or a building on a region on the ground below the airspace, and flying object 10 falls from the airspace, flying object 10 will be likely to collide with the person or the building, and thus the risk is high. Accordingly, it may be determined that passing is not possible if, for example, attribute information of an airspace contains information indicating that there is a person or a building in a region on the ground that corresponds to the airspace. Furthermore, if, for example, wireless communication is not possible in an airspace, it is not possible to externally instruct flying object 10 that is to pass or is to be passed. Accordingly, it may be determined that passing is not possible if, for example, attribute information of an airspace contains information indicating that wireless communication is not possible in the airspace.

In the above-described embodiment, if flying object 10 performs a passing operation with respect to another flying object 10, flying object 10 may notify the other flying object 10 of its intention to pass and may instruct the other flying object 10 to perform a predetermined operation. The "predetermined operation" is, for example, an operation of continuing a flying operation scheduled in its flight plan if flying object 10 can sufficiently accelerate. In this modification, communication device 14 or beacon apparatus 17 shown in FIG. 3 may be used as a notification unit configured to perform such notification and instruction. For example, flying object 10 may wirelessly communicate with another flying object 10 to transmit notification information of notifying the other flying object 10 of passing it, and instruction information of instructing the other flying object 10 to perform a predetermined operation. The other flying object 10 performs the predetermined operation upon receiving notification regarding passing from flying object 10 and receiving an instruction to perform a predetermined operation. If flying object 10 does not make notification of notifying the other flying object 10 of passing it, there will be the risk that the other flying object 10 may counteract, due to its function to avoid a collision, flying object 10 that performs a passing operation. According to this modification, such inconveniences are prevented.

REFERENCE SIGNS LIST

1: Flight control system
10: Flying object
20: Server device
111: Transmitting unit
112: Receiving unit
113: Detection unit
114: First acquisition unit
115: Receiving unit
116: Judging unit
117: Response unit
118: First specifying unit
119: Second specifying unit
120: First judging unit
121: Second acquisition unit
122: Second judging unit
123: Determination unit
124: Flight control unit

What is claimed is:

1. A flight control apparatus comprising:
a processor of a flying object having a first priority of a first flight purpose configured to:
  detect, in a predetermined range from the flying object, another flying object;
  acquire a second priority of a second flight purpose for the other flying object;
  specify a moving direction of the detected other flying object;
  judge, based on the specified moving direction, whether or not passing is possible;
  determine, based on a relationship between the flying object and the other flying object, content of a passing operation to be performed by the flying object with respect to the other flying object;
  control flight of the flying object and perform the passing operation according to the determined content of the passing operation, when judged that the passing is possible and the first priority of a first flight purpose for the flying object is greater than the second priority of the second flight purpose for the other flying object;
  determine, based on a relationship between the flying object and the other flying object, a content of an operation for allowing the other flying object to pass the flying object; and
  control flight of the flying object and perform the operation of allowing the other flying object to pass according to the determined content of the operation, when judged that the passing is possible and the first priority of a first flight purpose for the flying object is less than the second priority of the second flight purpose for the other flying object.

2. The flight control apparatus according to claim 1, wherein the processor is further configured to:
judge, based on movement information of the other flying object, whether or not there is a likelihood of collision between the flying object and the other flying object, and
perform the passing operation, when it has been judged that there is a likelihood of collision and that the passing is possible.

3. The flight control apparatus according to claim 1, wherein the processor is further configured to:
judge that the passing is possible, when the specified moving direction corresponds to a moving direction of the flying object.

4. The flight control apparatus according to claim 1, wherein the processor is further configured to:
acquire attribute information that indicates an attribute of an airspace in which the flying object is flying, judge whether or not the passing is possible, based on the specified moving direction and the attribute indicated by the acquired attribute information whether or not passing is possible.

5. The flight control apparatus according to claim 4,
wherein the attribute information includes information indicating whether or not passing is allowed in the airspace, information indicating a size of the airspace, or information indicating whether or not a margin space is added to the airspace, and
wherein the attribute includes that passing is possible, when the passing is allowed in the airspace, the size of the airspace is a predetermined size or larger, or the margin space is added to the airspace.

6. The flight control apparatus according to claim 1, wherein the processor is further configured to determine content of the passing operation including a predetermined distance that the flying object flies from the other flying object.

7. The flight control apparatus according to claim 1,
wherein the processor is further configured to determine the content of the passing operation further including a change in flight speed or a change in flight path.

8. The flight control apparatus according to claim 1,
wherein the processor is further configured to determine the content of the passing operation based on at least one of weights and performances of the flying object and the other flying object.

9. The flight control apparatus according to claim 1, wherein the processor is further configured to:
notify, if the passing operation is to be performed, the other flying object of the intention to pass, and to instruct the other flying object to perform a predetermined operation, and
perform the predetermined operation by the other flying object, upon being notified by the other flying object of the intention to pass the flying object.

10. The flight control apparatus according to claim 1, wherein the processor is further configured to specify the moving direction of the detected other flying object based on a change in the intensity of an identification signal received from the other flying object.

11. The flight control apparatus according to claim 1, wherein the processor is further configured to specify the moving direction of the detected other flying object based on a flight plan of the other flying object.

12. The flight control apparatus according to claim 1, wherein the specified moving direction of the detected other flying object corresponds to a moving direction of the flying object.

13. A flight control system comprising:
a server configured to:
manage air traffic of a flying vehicle; and
a processor of a flying object having a first priority of a first flight purpose configured to:
detect, in a predetermined range from the flying object, another flying object;
acquire a second priority of a second flight purpose for the other flying object;
specify a moving direction of the detected other flying object;
judge, based on the specified moving direction, whether or not passing is possible;
determine, based on a relationship between the flying object and the other flying object, content of a passing operation to be performed by the flying object with respect to the other flying object;
control flight of the flying object and perform the passing operation according to the determined content of the passing operation, when judged that the passing is possible and the first priority of a first flight purpose for the flying object is greater than the second priority of the second flight purpose for the other flying object;
determine, based on a relationship between the flying object and the other flying object, a content of an operation for allowing the other flying object to pass the flying object; and
control flight of the flying object and perform the operation of allowing the other flying object to pass according to the determined content of the operation, when judged that the passing is possible and the first priority of a first flight purpose for the flying object is less than the second priority of the second flight purpose for the other flying object.

* * * * *